United States Patent [19]

Ito et al.

[11] Patent Number: 4,642,622
[45] Date of Patent: Feb. 10, 1987

[54] VIDEO SIGNAL GENERATING CIRCUIT

[75] Inventors: Syoichi Ito, Ibaraki; Ken-ichi Akahori, Hitachi, both of Japan

[73] Assignee: Hitachi, Ltd., Tokyo, Japan

[21] Appl. No.: 481,937

[22] Filed: Apr. 4, 1983

[30] Foreign Application Priority Data

Apr. 5, 1982 [JP] Japan .................................. 57-55410

[51] Int. Cl.[4] ............................................. G09G 1/06
[52] U.S. Cl. .................... 340/724; 340/748; 340/750
[58] Field of Search ................ 340/724, 750, 748; 382/56

[56] References Cited

U.S. PATENT DOCUMENTS

| | | | |
|---|---|---|---|
| 3,877,007 | 4/1975 | Fishman | 340/724 |
| 3,918,040 | 11/1975 | Beuter et al. | 340/724 |
| 4,246,578 | 1/1981 | Kawasaki et al. | 340/724 |
| 4,323,892 | 4/1982 | Kinghorn | 340/724 |
| 4,342,990 | 8/1982 | Traster | 340/724 |

OTHER PUBLICATIONS

G. I. Findley et al, "Control of the IBM 3800 Printing Subsystem", IBM J. Res. Develop., vol. 22, No. 1, Jan. 1978, pp. 108–116.

Primary Examiner—Gerald L. Brigance
Assistant Examiner—Jeffery Brier
Attorney, Agent, or Firm—Antonelli, Terry & Wands

[57] ABSTRACT

A video signal generating circuit comprises a buffer memory for storing character codes and control data for control of vertical character positions, a character pattern memory having a plurality of stored character patterns which are selected by the output of the buffer memory, and a control circuit for successively reading the character codes and control data from the buffer memory and the character patterns from the character pattern memory. The value of a logical operation of raster data generated by the control circuit and the control data is used as raster data or an effective raster scan signal for the character pattern memory.

11 Claims, 10 Drawing Figures

FIG. 6

| ADDRESS<br>A8 7 6 5 4 3 2 1 0 | DATA<br>D0 1 2 3 4 5 6 7 |
|---|---|
| 0 0 0 0 0 0 0 0 0 | 1st CHARACTER CODE |
| 0 0 0 0 0 0 0 0 1 | 2nd CHARACTER CODE |
| 0 0 0 0 0 0 0 1 0 | 3rd CHARACTER CODE |
| 0 0 0 0 0 0 0 1 1 | 4th CHARACTER CODE |
| | 254th CHARACTER CODE |
| 0 1 1 1 1 1 1 1 0 | 255th CHARACTER CODE |
| 0 1 1 1 1 1 1 1 1 | 256th CHARACTER CODE |
| 1 0 0 0 0 0 0 0 0 | 1st CONTROL DATA |
| 1 0 0 0 0 0 0 0 1 | 2nd CONTROL DATA |
| 1 0 0 0 0 0 0 1 0 | 3rd CONTROL DATA |
| 1 1 1 1 1 1 1 1 0 | 255th CONTROL DATA |
| 1 1 1 1 1 1 1 1 1 | 256th CONTROL DATA |

LINE BUFFER ADDRESS

VIDEO SIGNAL GENERATING CIRCUIT

The present invention relates to a video signal generating circuit using a character pattern memory (character generator), and more particularly to such a circuit in which the capacity of the character pattern memory is reduced. The video signal generating circuit is advantageous, especially when it is used in a laser beam printer.

Referring to FIG. 1 showing an example of a laser beam printer in which the video signal generating circuit of the present invention can be used, the printer includes a signal generating device 7 for generating a video signal representative of characters to be printed, a video amplifier 1 for amplifying the video signal from the signal generating device 7, a laser diode 2 whose beam emission is modulated by the output of the video amplifier 1, a coupling lens 3 for shaping the laser beam emitted from the laser diode 2, a polygonal mirror 5 which is rotated by a scanner motor 4, and a photoconductor drum 6. An image formed on the surface of the photoconductor drum 6 is subjected to a well known xerographic process to produce a desired print.

A video signal generating circuit in the signal generating device 7 generates, a video signal in bit data form providing (nx) x (ny) dots as shown in FIG. 2a, in accordance with the horizontal scan of the laser beam and the rotation of the photoconductor drum 6. In order to generate such a video or character signal, the signal generating device 7 includes a character pattern memory (character generator) in which predetermined character patterns are stored.

In printing alphabetical characters as shown in FIG. 2a, the large and small characters have different vertical positions. Therefore, redundant regions including ranges nd as shown in FIG. 2a were required in the conventional character pattern memory. Similarly, as is apparent from consideration of the case where a combination of numerical characters having different vertical positions are printed, as shown in FIG. 2b, the conventional character pattern memory not only requires a redundant region nd for each numerical character, but also there must be provided at least two kinds of normal and high position patterns for each numerical character. For such circumstances, a large capacity was required for the conventional character pattern memory.

For example, the IBM 3800 Printing Subsystem using a laser beam printer has a character pattern memory with a character generator for large characters and a character generator for small characters in order to permit the printing of characters of different styles or sizes on the same print line, each of those character generators having 64 character patterns stored therein, each of which is selected by a 6-bit address input and contains data of 18 bits × 24 scan lines (see G. I. Findley et al "Control of the IBM 3800 Printing Subsystem", IBM J. RES. DEVELOP. Vol. 22, No. 1, January 1978, pp. 108–116).

There is now an increased demand for laser beam printers in view of their high printing speeds such as several-hundred pages/minute and their capabilities of providing a print of letter quality because of a high printing dot density, such as 300 dots/inch. But, the conventional laser printer requires a character pattern memory of high capacity. For example, at greatest 256 different characters are stored in the character pattern memory and a storage area for data of 32 bits × 48 scan lines is necessary for each character when the number of printing scan lines for one page line is 48 and the number of dots per character included on one printing scan line is 32. Therefore, it is desirable to reduce the capacity of the character pattern memory.

An object of the present invention is to provide a video signal generating circuit which uses a character pattern memory having the reduced capacity or storage area. In accordance with the present invention, the position of each character in a vertical direction can be controlled. In a certain embodiment, this vertical character position can be freely changed.

According to the present invention, there is provided a video signal generating circuit for generating a video signal representive of character pattern data of characters to be produced in the units of a page line, comprising: a character pattern memory containing a plurality of different character patterns stored therein, each of said character patterns being stored in bit data form in a predetermined number of scan lines, said character pattern memory having a first address input portion for selecting one of the stored character patterns and a second address input portion for selecting one of the scan lines for the selected character pattern; buffer memory means supplied and storing character codes of characters to be produced in at least one page line and control data used for controlling the respective vertical positions of the characters to be produced, the character code read from said buffer memory means being applied to said first address input portion of said character pattern memory to select one of the character patterns in said character pattern memory corresponding to the character to be produced; and a control circuit for controlling the sequential read of the character codes from said buffer memory means, the sequential read of the control data corresponding to the read character codes from said buffer memory means and the sequential read of the pattern memory, said control circuit including logical operation means for performing a predetermined logical operation using the control data read from said buffer memory means to produce a first signal which is applied to said second address input portion of said character pattern memory for selecting one of the scan lines in the selected character pattern and a second signal which indicates whether or not the read of the selected character pattern data from said character pattern memory should be enabled.

Preferred embodiments of the present invention will now be described referring to the accompanying drawings, in which:

FIG. 6 shows addresses and stored contents of a line buffer memory shown in FIG. 4;

Figure 3:
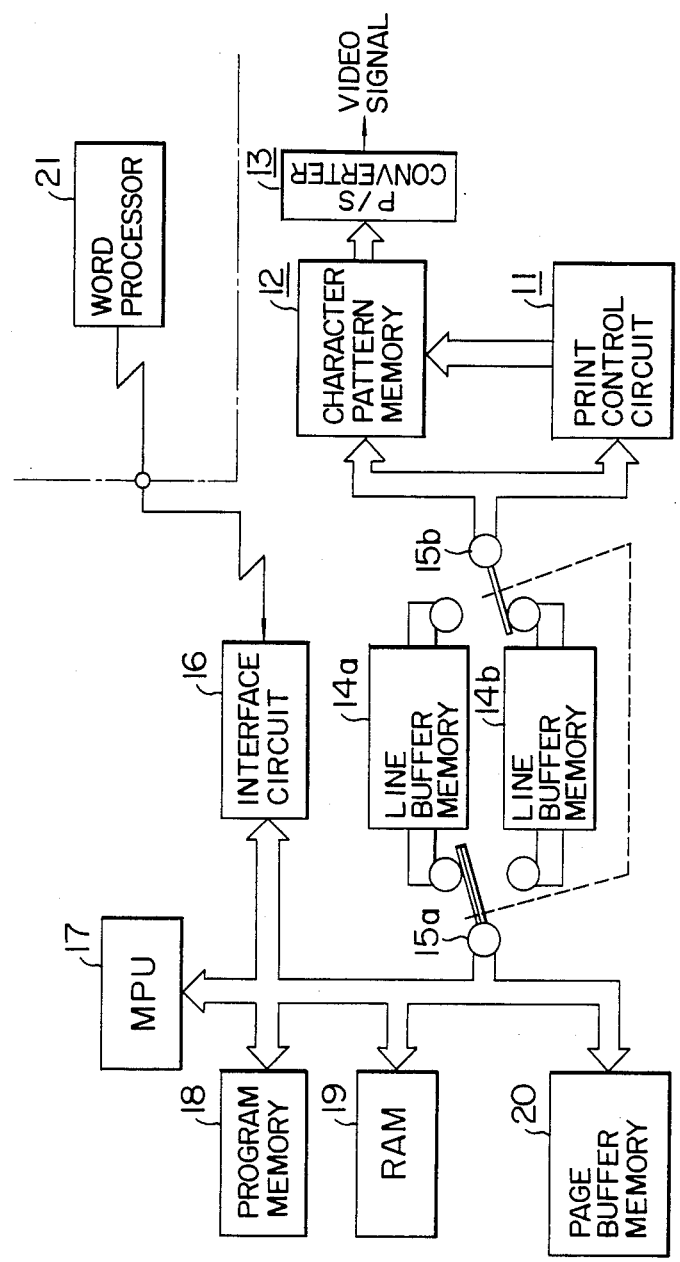
FIG. 3 is a block diagram showing an example of a signal generating device in which a video signal generating circuit of the present invention can be used.

Referring to FIG. 3 showing in block diagram an example of a signal generating circuit in which a video signal generating circuit of the present invention can be used, reference numeral 21 designates a character processor such as a word processor for delivering data to be printed in a character code form such as ASCII code to a signal generating device. The operator manipulates a keyboard on the word processor to produce text data which is in turn transferred to the signal generating device in the form of ASCII code. When a laser printer is used as a terminal device of a general purpose computer, the computer itself serves as a character processor.

A microprocessor (MPU) 17 operates in accordance with instruction words stored in a program memory 18. A random access memory (RAM) 19 is used for temporarily storing data to be processed in the microprocessor 17. A page buffer memory 20 is provided for storing data of character code form received through an interface circuit 16 from the word processor 21. The page buffer memory 20 stores data of one page in individual addresses associated with the writing lines of the page and with the order position of the character within the writing line. However, the memory may have a capacity capable of storing data of plural pages, as required. For storing plural pages, separate page memories may be also used.

Reference numerals 14a and 14b designates line buffer memories each of which receives character codes and control data necessary for printing of one line from the side of the microprocessor 17 and delivers them to a print control circuit 11. Each of the line buffer memories may include a character code buffer memory which stores the character codes and a control data buffer memory which stores the control data used for controlling the vertical position of a character to be printed.

Bus change-over circuits 15a and 15b are provided for alternating the data supply from the microprocessor side to the line buffer memories 14a and 14b as well as the data read from the line buffer memories 14a and 14b to the print control circuit 11. Namely, in the illustrated switch positions of the bus change-over circuits 15a and 15b, the line buffer memory 14b in which data for one page line has been written is used for printing while data for the next page line is written in the line buffer memory 14a from the microprocessor side. Next, the bus change-over circuits 15a and 15b are switched so that printing for that next page line is performed using the line buffer memory 14a while data for the subsequent next page line is written in the line buffer memory 14b. Though the two line buffer memories 14a and 14b are used, a single line buffer memory may be used. In this case, however, the data processing speed becomes slow since a printing operation must be made after data for one page line has been stored in the single line buffer memory from the page buffer memory 16.

The print control circuit 11 operates to selectively read character pattern data from a character pattern memory 12 (which may be a ROM or RAM) in accordance with data read from the line buffer memory 14a or 14b.

Figure 1:
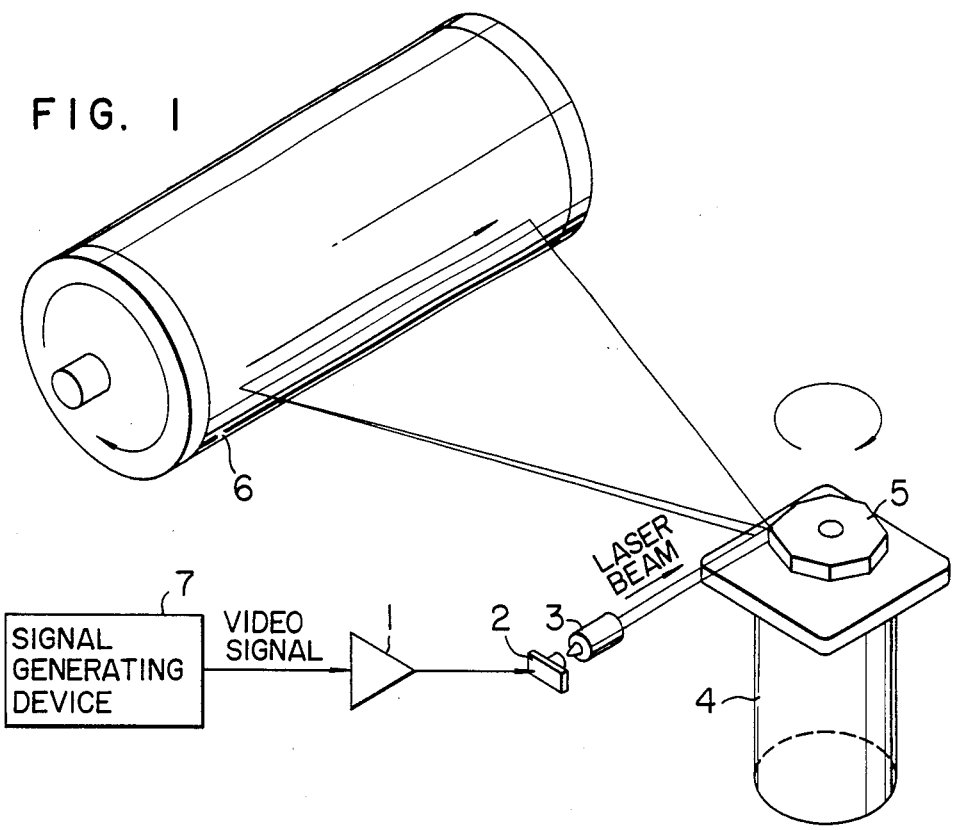
FIG. 1 is a schematical view showing an example of a laser beam printer to which the present invention can be applied.

Parallel data read from the character pattern memory 12 is converted into serial data by a parallel/serial (P/S) converter 13. The serial data is used to modulate the laser diode 2 shown in FIG. 1.

The print control circuit 11, the character pattern memory 12, the parallel/serial converter 13 and the line buffer memories 14a and 14b form a video signal generating circuit to which the present invention relates.

The construction and operation of such a video signal generating circuit will now be explained referring to FIGS. 4 to 7.

Figure 4:
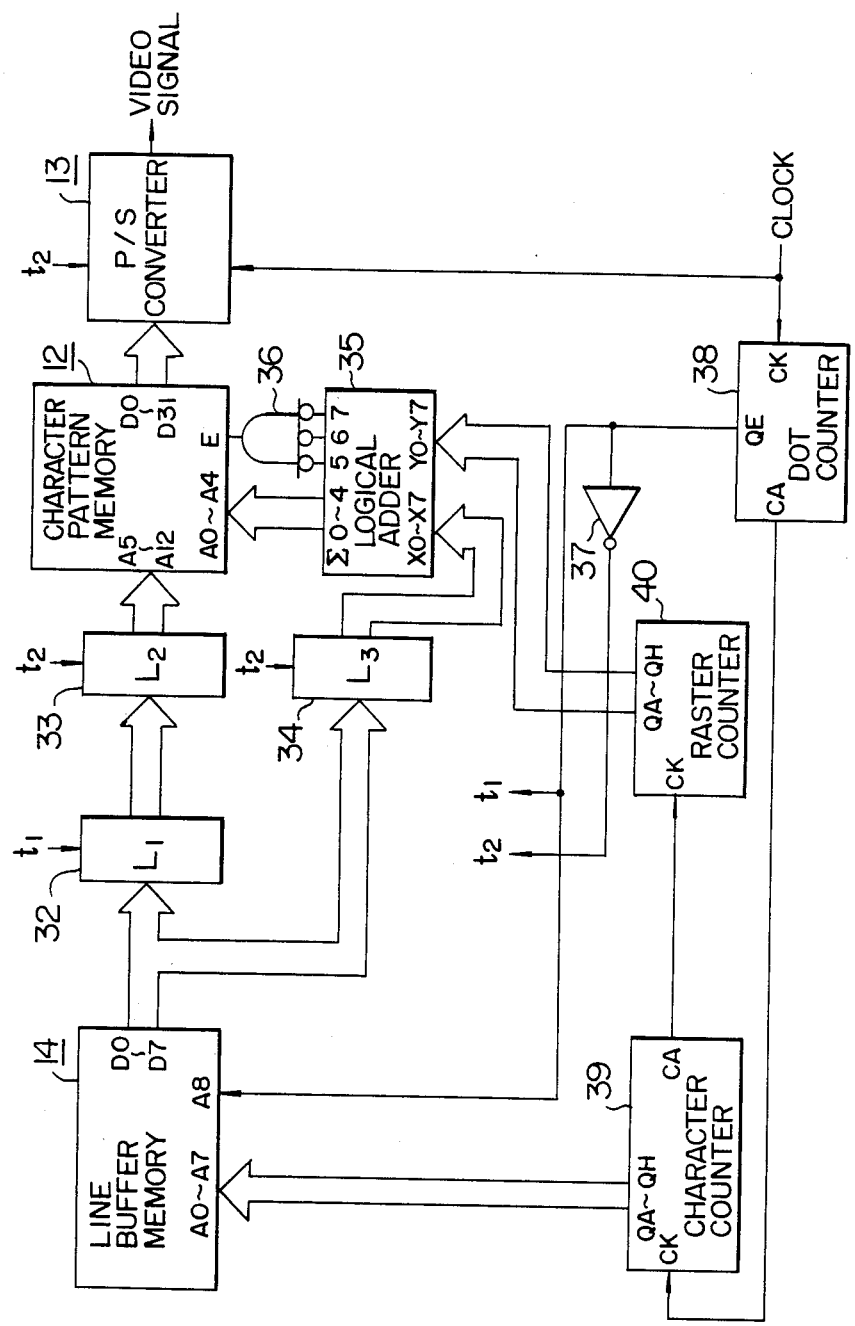
FIG. 4 is a circuit diagram of a video signal generating circuit according to a first embodiment of the present invention.

FIG. 4 shows a circuit diagram of a video signal generating circuit according to a first embodiment of the present invention. In FIG. 4, one of the line buffer memories 14a and 14b as well as the bus change-over circuits 15a and 15b shown in FIG. 3 are omitted for convenience of illustration. The line buffer memory 14 shown in FIG. 4 represents one of the buffer memories 14a and 14b in which data for one page line has been stored.

In FIG. 4, components excepting the character pattern memory 12, the parallel/serial converter 13 and the line buffer memory 14 constitute the print control circuit 11 shown in FIG. 3 which serves as means for reading character codes and control data from the line buffer memory 14 and character pattern data from the character pattern memory 12.

The line buffer memory 14 stores character codes (1st to 256th 8-bit character codes in the shown example) for one page line and control data (1st to 256th 8-bit control data corresponding to or associated with the 1st to 256th character codes, respectively) as shown in FIG. 6, which data is supplied from the microprocessor side. The control data is raster offset data for controlling the vertical position of the corresponding character, as will be understood from the explanation to be provided hereinafter. The control data may be inherent data corresponding to characters and is stored in a data area of the program memory 18. Data for arbitrarily moving the character position upwards or downwards is included as other control data in the text.

Outputs D0–D7 (8 bits) of the line buffer memory 14 are connected to the inputs of latch circuits 32 and 34 (L1 and L3). The character code is stored into the latch circuit 32 at the rising edge of a timing signal $t_1$ applied thereto while the raster offset data is stored into the latch circuit 34 at the rising edge of a timing signal $t_2$. An output of the latch circuit 32 is connected to the input of a latch circuit 33 (L2) into which the character code from the latch circuit 32 is stored at the rising edge of the timing signal $t_2$. An output of the latch circuit 33 is connected to address inputs A5–A12 (8 bits) of the character pattern memory 12 to select a character to be printed.

A character counter 39 is provided for counting the number of characters within one page line. Counter outputs QA–QH of the character counter 39 are connected to address inputs A0–A7 (8 bits) of the line buffer memory 14 to select the character code and control data corresponding to the sequential order position of the character within one page line. The line buffer memory 14 has an address input A8 applied with the timing signal $t_1$ which is used for the timing control of the read of the control data from the line buffer memory 14. A carry output of the character counter 39 is connected to the clock input CK of a raster counter 40 which in turn counts the number of raster or printing scan lines included in one page line to be printed.

A logical adder 35 having inputs X0-X7 (8 bits) connected to the output of the latch circuit 34 and inputs Y0-Y7 (8 bits) connected to counter outputs QA-QH of the raster counter 40, produces a logical sum of the inputs X and Y at its output terminals Σ0-Σ7 (8 bits). The output terminals Σ0-Σ4 (5 bits) are connected to address inputs A0-A4 of the character pattern memory 12 while the output terminals Σ5-Σ7 (3 bits) are connected to a negative AND gate 36. The outputs Σ0-Σ4 of the logical adder 35 applied to the address inputs A0-A4 of the character pattern memory 12 serve as raster or scan line data for the memory. The character pattern memory 12 has at greatest 256 different character patterns stored therein, each character pattern including 32×32 bit data in 32 scan lines each of which has a 32-bit data portion. One character pattern to be printed corresponding to the character position within the page line under consideration is selected by the address inputs A5-A12 while a particular scan line of the selected character pattern is selected by the address inputs A0-A4 so that the 32-bit data portion included in the selected scan line is read from the character pattern memory 12.

An output of the above-mentioned negative AND gate 36 is connected to an ENABLE terminal of the character pattern memory 12. The data read from the character pattern becomes valid when all the outputs Σ5-Σ7 of the logical adder 35 are "0". Outputs D0-D31 (32 bits) thus provided from the character pattern memory are applied to the parallel/serial converter 13 whose serial output is used as a video signal.

In FIG. 4, reference numeral 37 designates an inverter. A dot counter 38 is provided for counting the number of dots (32 dots) per character to be contained in one of raster or printing scan lines within one page. A carry output CA of the dot counter 38 is connected to a clock input CK of the character counter 39 and a counter output QE of the dot counter 38 is used as the timing signals $t_1$ and $t_2$.

Figure 2A:
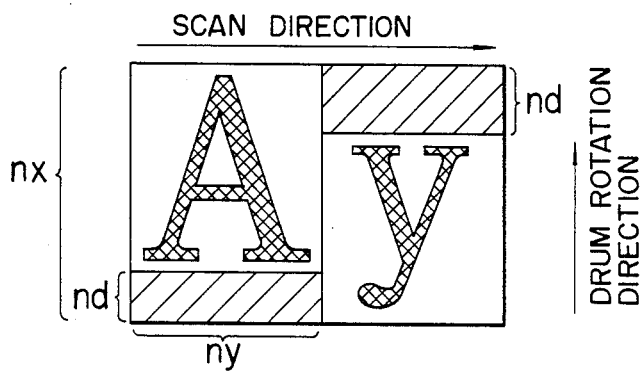
FIGS. 2a and 2b show examples of characters to be printed.
Figure 7:
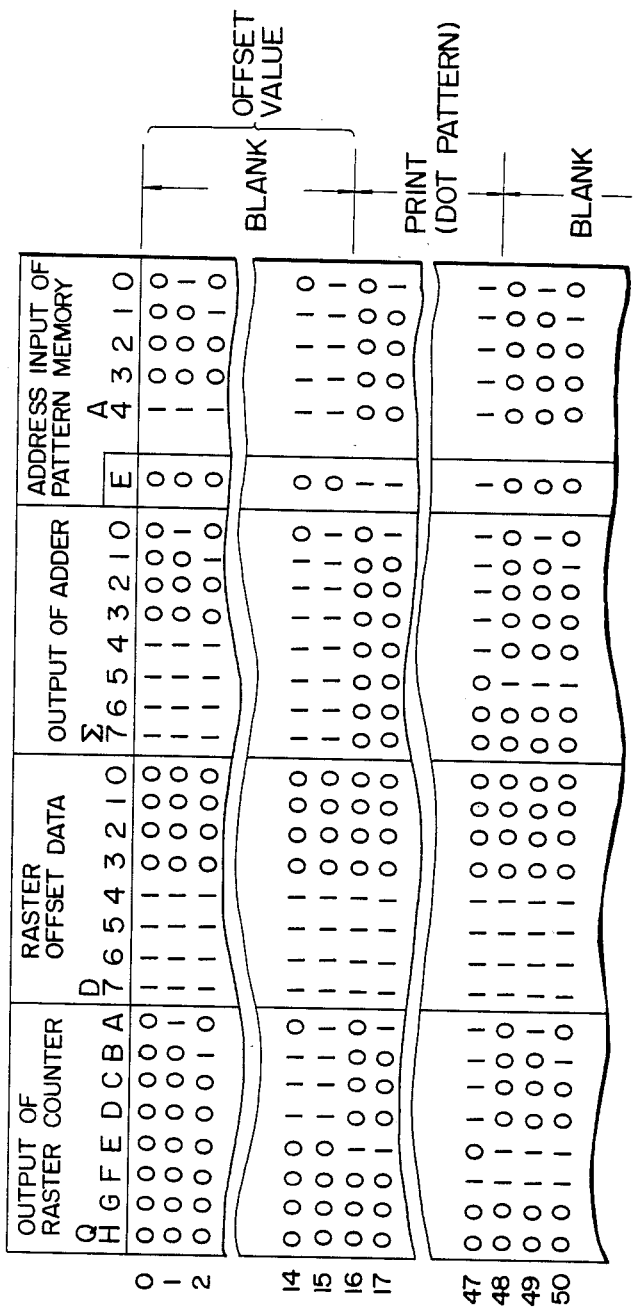
FIG. 7 shows a relation between the output of a raster counter, raster offset data, the output of a logical adder and the address inputs of a character pattern memory and also shows how the vertical position of a character to be printed is controlled.

The relation between the operation of the logical adder 35 and the address inputs to the character pattern memory 12 is shown in FIG. 7. As understood from the figure, the raster offset data is selected to be the one's complement of a desired offset value by which the character selected by the corresponding character code is to be offset from the first one of the raster scan lines in one page line to be printed. Namely, in the illustrated example in the case where it is desired to make the read of the 1st scan line of the selected character pattern in the character pattern memory 12 effective at the 17th raster or printing scan line or upon issuance of decimal 16 (binary 00010000) from the raster counter 40, thereby printing, for example, a small character "y" as shown in FIG. 2a, the offset value is 15 (binary 00001111) and hence the raster offset data is established as the one's complement 11110000 of the offset value 00001111. It should be noted that FIG. 7 shows the relation between the output of the raster counter 40, the raster offset data, the output of the logical adder 35 and the address inputs A0-A4 and the ENABLE input E of the character pattern memory 12 in conjunction with only one character. Actually, for each output from the raster counter 40, particular scan lines of respective character patterns in the character pattern memory 12 corresponding to characters in one page line to be printed are successively addressed. However, unless all the outputs Σ5-Σ7 of the logical adder 35 producing the logical sum of the raster counter output and the raster offset data are "0" or the ENABLE input E of the character pattern memory 12 is "1", the data read from the character pattern memory 12 is ineffective or masked. When it is desired to print a large character "A" before "y" as shown in FIG. 2a, the raster offset data for the character "A" will be selected to be 11111111 since the offset value may be regarded as being 0 (binary 00000000), and hence the reading of data from the character pattern memory 12 for the character "A" becomes effective from when the raster counter output is 1 (i.e. from the second raster or printing scan line). For the raster counter outputs of 1 to 32, the 1st to 32nd scan lines of the character pattern "A" are effectively read from the memory 12. For the raster counter outputs of 0 and 33 to 47, the 48th and 1st to 15th scan lines are again addressed but the read thereof is disabled. During the raster counter outputs of 33 to 47, the 18th to 32nd scan lines of the character "y" are effectively read.

If it is desired to permit the effective data read from the character pattern memory at the first raster or printing scan line, the raster offset data may be selected to be the two's complement of the offset value.

Figure 5:
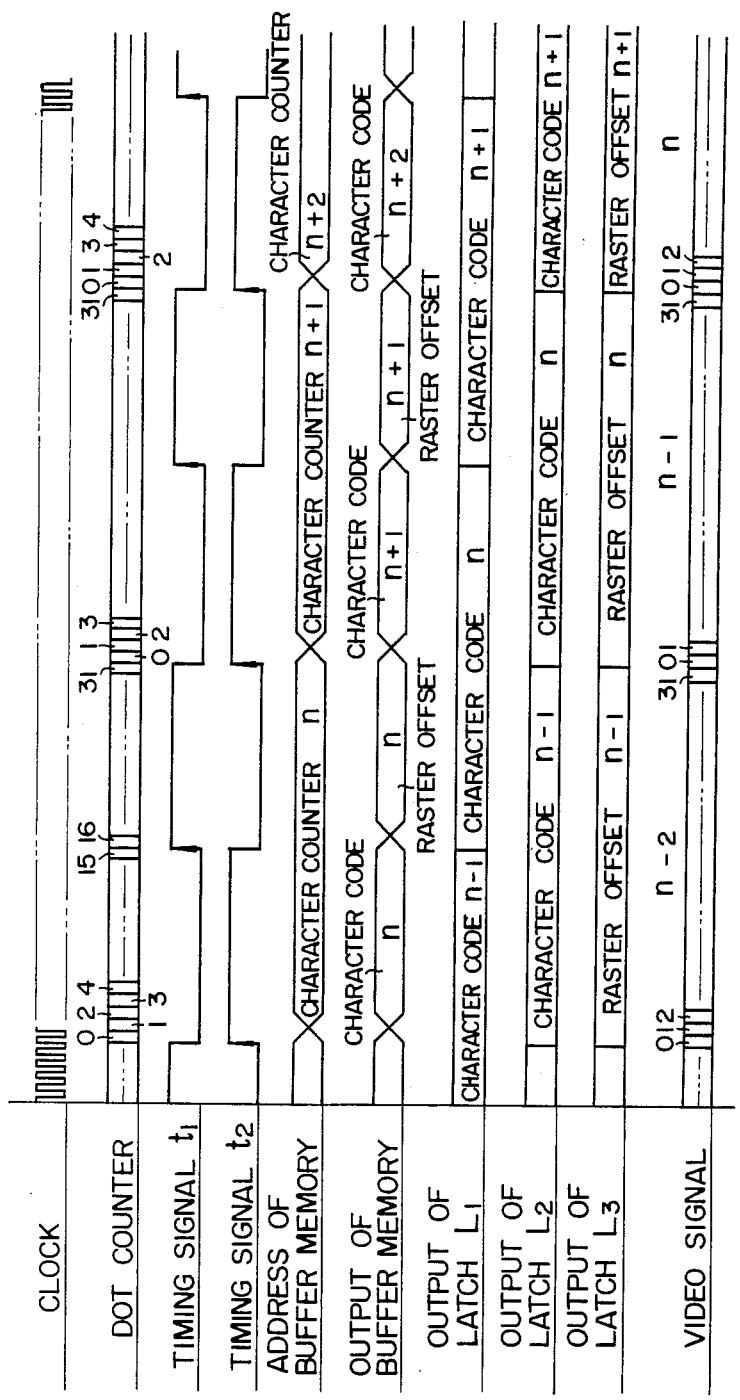
FIG. 5 is a timing chart illustrating the circuit shown in FIG. 4.

A timing chart illustrating the operation of the circuit shown in FIG. 4 is shown in FIG. 5.

Figure 2B:
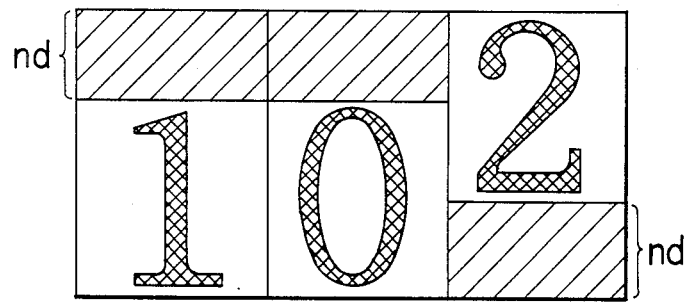

For the above explanation made in conjunction with FIG. 7, it will be understood that the reading of desired character patterns from the character pattern memory can be respectively made effective starting from predetermined individual printing scan lines in accordance with the raster offset data established corresponding to character codes representative of characters to be printed. Therefore, in the case where the print area for one character is covered by 32×48 dots, the conventional scheme has required a character pattern memory having a data storage region of 32 bits×48 scan lines for each character pattern while a data storage region of only 32 bits×32 scan lines for each character pattern is required for the character pattern memory in the disclosed embodiment of the present invention. As a result, the character pattern memory can be realized with reduced capacity. Also, in the embodiment shown in FIG. 4, the raster offset data to be associated with the same character can be freely established to have a different value. Therefore, a need of preparing plural kinds of patterns for the same character in a character pattern memory due to different vertical printing positions, as has been explained in conjunction with FIG. 2b, is eliminated.

Next, a video signal generating circuit according to a second embodiment of the present invention will be explained referring to FIGS. 8 and 9.

In the first embodiment, the raster offset data associated with respective characters to be printed have been supplied from the microprocessor side to the line buffer memory for every page line. However, in the second embodiment which is applicable to the case where the raster offset data may have fixed values inherent to characters respectively as in the case where only alphabetical characters are to be printed, a set of raster offset data fixedly associated with 256 kinds of character patterns prepared in the character pattern memory is preliminarily or initially written in the line buffer memory. One of the previously stored raster offset data can be selectively read from the line buffer memory by using as an address signal any given character code which is newly supplied to and read from the line buffer memory.

Figure 8:
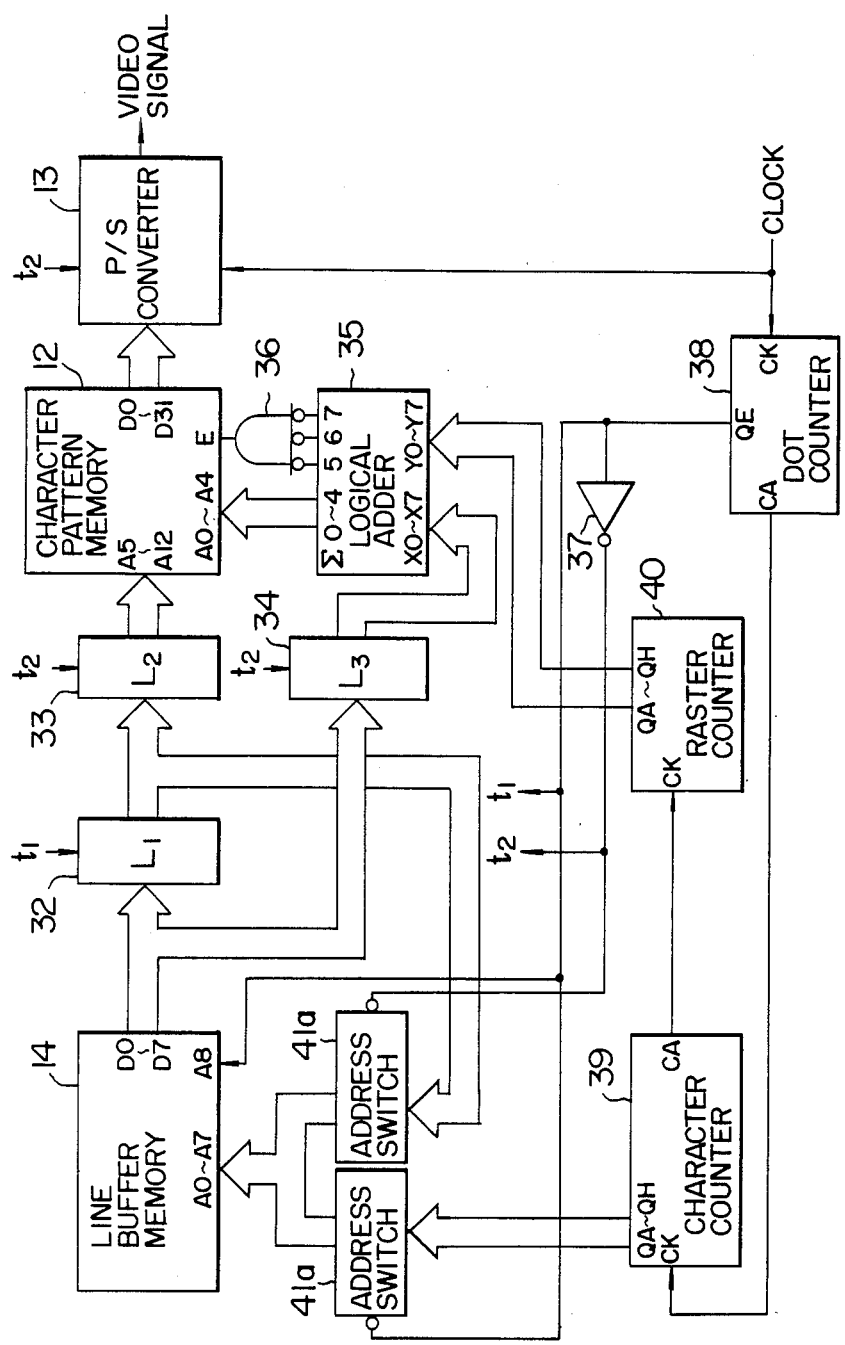
FIG. 8 is a circuit diagram of a video signal generating circuit according to a second embodiment of the present invention.
Figure 9:
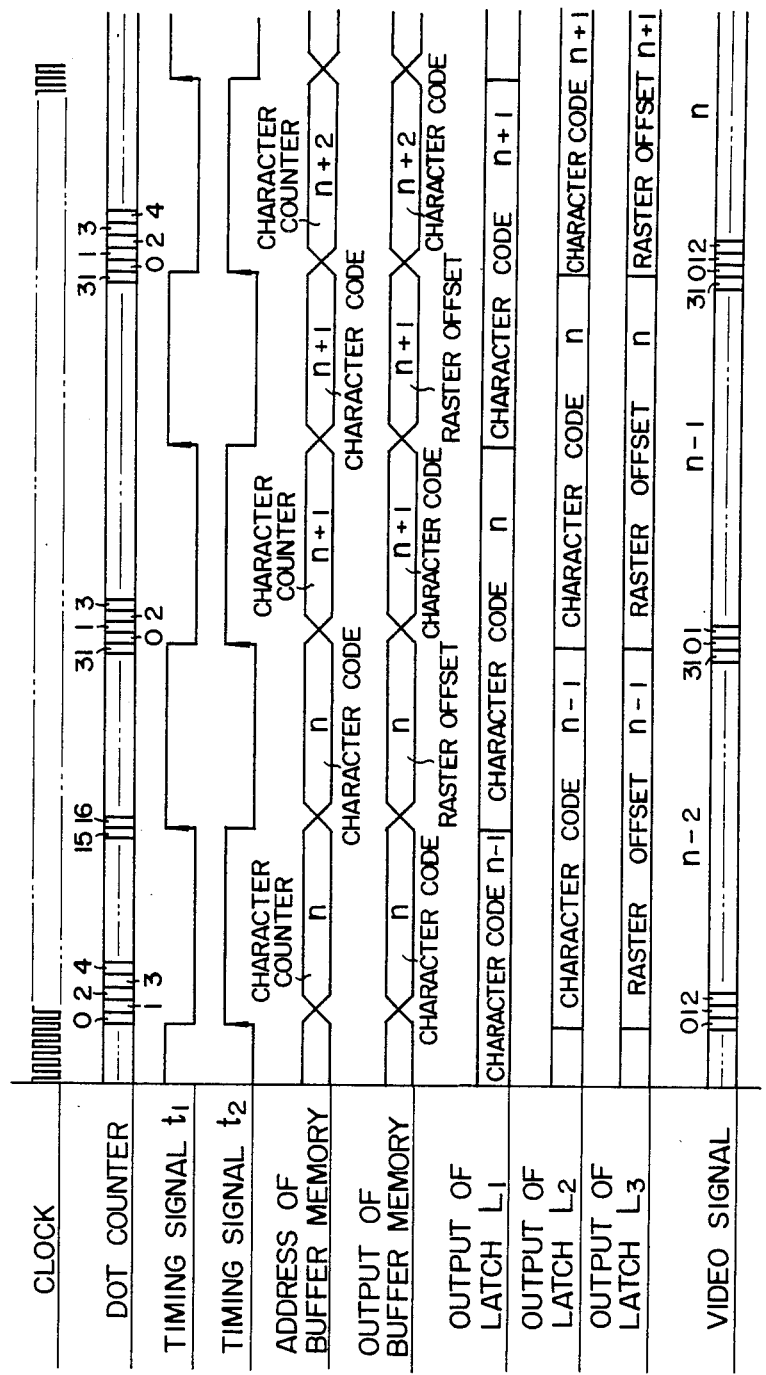
FIG. 9 is a timing chart illustrating the circuit shown in FIG. 8.

In FIG. 8, the same reference numerals as those in FIG. 4 represent similar components. Reference numerals 41a and 41b designate address switches. FIG. 9 is a timing chart illustrating the operation of the circuit shown in FIG. 8.

By use of the address switches 41a and 41b, the address inputs A0–A7 of the line buffer memory 14 are alternately switched to the output of the character counter 39 and the character code supplied from the line buffer memory 14 through the latch circuit 32.

In accordance with the, present embodiment, data processing speed can be enhanced since it is not required that raster offset data is supplied from the microprocessor side to the line buffer memory for every character code and for every page line.

Though the video signal generating circuit according to the present invention has been described and shown in conjunction with the specified embodiments, various modifications or changes will be apparent to those skilled in the art. For example, though explanation has been made of the case where the line buffer memory for storing data for one page line, a page buffer memory can be used instead of the line buffer memory. In that case, a page line counter is provided while replacing the line buffer memory 14 in FIG. 4 or 8 by the page buffer memory; the carry (CA) output of the raster counter 40 is connected to a clock (CK) input of the page line counter; and the page buffer memory is addressed by counter outputs Q of the page line counter to designate successive page lines. Also, though both the character code data and the control data have been stored in a single line buffer memory, individual buffer memories may be provided for storing the character code data and the control data, respectively. In that case, the latch circuits 32–34 can be omitted. Further, the 8-bit adder 35 may be replaced by two 4-bit adders which are commercially available.

The present invention has been described in conjunction with the applications to laser beam printers. But, the video signal generating circuit according to the present invention is not limited to those applications. For example, it is also applicable to character display on a CRT screen. Thus, though the video signal generating circuit according to the present invention is particularly advantageous in the applications to laser beam printers, it can be used for any application in which the print or display of characters is possible using a character pattern memory and based on the generation of a video signal representative of character pattern data of the characters to be printed or displayed.

According to the present invention, the vertical position of a character to be printed or displayed can be controlled so that a character pattern memory can be realized with a reduced capacity while eliminating redundant storage area. According to the first embodiment, the vertical character position can be arbitrarily changed so that a need of preparing plural kinds of patterns for the same character in a character pattern memory due to different vertical printing or display positions is eliminated. According to the second embodiment, a character code read from the line buffer memory can be used for addressing or selecting the corresponding offset data previously stored in the line buffer memory so that a need of supplying offset data to the line buffer memory for every page line is eliminated, thereby enhancing the data processing speed. Since control data is supplied in the units of a page line, the memory capacity for the control data is small. An effective scanning signal or raster can be produced by a simple construction including three latch circuits and one logical adder.

What is claimed is:

1. A video signal generating circuit for generating a video signal representative of character pattern data to be produced on a page line, comprising:

a character pattern memory containing a plurality of different character patterns stored therein, each of said character patterns being stored in bit data form in a predetermined number of scan lines, said character pattern memory having a first address input portion for selecting one of the stored character patterns and a second address input portion for selecting one of the scan lines for the selected character pattern;

buffer memory means supplied with and storing character codes of characters to be produced in at least one page line, said buffer memory means having control data previously stored therein for controlling the respective vertical positions of the characters to be produced, which control data includes position data for the respective character patterns stored in said character pattern memory, each of said character codes read from said buffer memory means forming an address signal which is applied to said first address input portion of said character pattern memory to select one of the character patterns in said character pattern memory corresponding to the character to be produced and is also applied to said buffer memory means as an address signal to selectively read out one of the position data corresponding to the read character code; and a control circuit for controlling the sequential reading of the character codes from said buffer memory means, the sequential reading of the control data corresponding to the read character codes from said buffer memory means and the sequential reading of the character pattern data from said character pattern memory, said control circuit including logical operation means for performing a predetermined logical operation using the control data read from said buffer memory means to produce a first signal which is applied to said second address input portion of said character pattern memory for selecting one of the scan lines in the selected character pattern and a second signal which indicates whether or not the reading of the selected character pattern data from said character pattern memory should be enabled, a dot counter for counting the number of dots per character to be contained in one of the raster scan lines included within one page line to be produced, a character counter for counting the number of characters to be included within the page line, and a raster counter for counting the number of the raster scan lines within the page line, and wherein said logical operation means has a logical adder for producing a logical sum of the control data read from said buffer memory means and an output of said raster counter and a logical gate for receiving a predetermined bit portion of the output of said logical adder to produce said second signal, the remaining bit portion of the output of said logical adder being applied to said second address input portion of said character pattern memory as said first signal.

2. A video signal generating circuit according to claim 1, wherein each of the control data corresponding to said character codes is selected to be the one's complement of a desired offset value by which the character selected by the corresponding character code is to be offset from the first one of the raster scan lines in one page line to be produced.

3. A video signal generating circuit according to claim 1, wherein said buffer memory means includes a single buffer memory for storing both said character codes and said control data.

4. A video signal generating circuit according to claim 1, wherein said buffer memory means includes a first buffer memory for storing said character codes and a second buffer memory for storing said control data.

5. A video signal generating circuit according to claim 1, wherein said buffer memory means includes a line buffer memory from which said character codes are successively selected and read in accordance with an output of said character counter, the timing of the read of the control data from said line buffer memory being controlled by an output of said dot counter.

6. A video signal generating circuit according to claim 5, wherein each of the control data corresponding to said character codes is selected to be the one's complement of a desired offset value by which the character selected by the corresponding character code is to be offset from the first one of the raster scan lines in one page line to be produced.

7. A video signal generating circuit for generating a video signal representative of character pattern data to be produced on a page line, comprising:
    a character pattern memory containing a plurality of character patterns stored therein, each of said character patterns being stored in bit data form in a predetermined number of scan lines, said character pattern memory having a first address input portion for selecting one of the stored character patterns and a second address input portion for selecting one of the scan lines for the selected character pattern;
    a line buffer memory supplied with and storing character codes of characters to be produced on at least one page line and control data used for controlling the respective vertical positions of the characters to be produced, the character code read from said line buffer memory being applied to said first address input portion of said character pattern memory to select one of the character patterns in said character pattern memory corresponding to the character to be produced; and
    a control circuit for controlling the sequential reading of the character codes from said line buffer memory, the sequential reading of the control data corresponding to the read character codes from said line buffer memory and the sequential reading of the character pattern data from said character pattern memory, said control circuit including a dot counter for counting the number of dots per character to be contained in one of the raster scan lines included within one page line to be produced, an output of said dot counter being used as a first timing signal, a character counter for counting the number of characters to be included within the page line, a raster counter for counting the number of the raster scan lines within the page line, a first latch circuit for latching the character codes read from said line buffer memory, a second latch circuit for latching the control data read from said line buffer memory, a logical adder for producing a logical sum of an output of said raster counter and the control data outputted from said second latch circuit, and means for inverting the output of said dot counter to produce a second timing signal, the reading of the character code and the control data from said line buffer memory being effected so that an output of said character counter selects the character code and control data stored in said line buffer memory corresponding to the sequential order position of each of the characters to be included within the page line while the character code is selected in response to one of the high and low levels of said first timing signal and the control data is selected in response to the other of the high and low levels of said first timing signal, the character code read from said line buffer memory being latched into said first latch circuit by said first timing signal, the control data read from said line buffer memory being latched into said second latch circuit by said second timing signal.

8. A video signal generating circuit according to claim 7, wherein a predetermined bit portion of the output of said logical adder is supplied to said second address input portion of said character pattern memory for selecting one of the scan lines in the selected character pattern, said control circuit further includes a logical gate for receiving the remaining bit portion of the output of said logical adder to produce a signal indicative of whether or not the reading of the selected character pattern data from said character pattern memory should be enabled.

9. A video signal generating circuit according to claim 8, wherein each of the control data corresponding to said character codes is selected to be the one's complement of a desired offset value by which the character selected by the corresponding character code is to be offset from the first one of the raster scan lines in one page line to be produced.

10. A video signal generating circuit according to claim 8, wherein for every page line, the character codes and the control data corresponding thereto are supplied to said line buffer memory.

11. A video signal generating circuit according to claim 8, wherein said control data supplied to said line buffer memory is data respectively and inherently associated with the character patterns stored in said character pattern memory, this control data being previously stored in said line buffer memory so that each of the character codes supplied to and read from said line buffer memory is used as an address signal for selectively reading one of the previously stored control data corresponding to the read character code.

* * * * *